(12) United States Patent
Hattori et al.

(10) Patent No.: US 9,464,898 B2
(45) Date of Patent: Oct. 11, 2016

(54) INERTIAL FORCE SENSOR AND ELECTRONIC DEVICE USING SAME

(71) Applicant: PANASONIC CORPORATION, Osaka (JP)

(72) Inventors: Isao Hattori, Fukui (JP); Takeshi Uemura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 14/379,535

(22) PCT Filed: Feb. 20, 2013

(86) PCT No.: PCT/JP2013/000925
§ 371 (c)(1),
(2) Date: Aug. 19, 2014

(87) PCT Pub. No.: WO2013/125212
PCT Pub. Date: Aug. 29, 2013

(65) Prior Publication Data
US 2015/0046737 A1    Feb. 12, 2015

(30) Foreign Application Priority Data

Feb. 21, 2012  (JP) ................................ 2012-034615

(51) Int. Cl.
*G06F 1/32* (2006.01)
*G01C 19/5776* (2012.01)
(Continued)

(52) U.S. Cl.
CPC ............. *G01C 19/5776* (2013.01); *G01P 3/44* (2013.01); *G01P 15/08* (2013.01); *G01P 15/097* (2013.01); *G06F 1/3296* (2013.01)

(58) Field of Classification Search
None
See application file for complete search history.

(56) References Cited

U.S. PATENT DOCUMENTS

| 4,705,388 A | 11/1987 | Huntjens et al. |
| 2005/0203430 A1* | 9/2005 | Williams .............. A61B 5/1117 600/513 |

(Continued)

FOREIGN PATENT DOCUMENTS

| CN | 1701223 A | 11/2005 |
| JP | 61-256372 | 11/1986 |

(Continued)

OTHER PUBLICATIONS

International Search Report issued Mar. 26, 2013 in International (PCT) Application No. PCT/JP2013/000925.

(Continued)

*Primary Examiner* — Paul Yanchus, III
(74) *Attorney, Agent, or Firm* — Wenderoth, Lind & Ponack, L.L.P.

(57) ABSTRACT

An inertial force sensor includes the following elements: a sensor element for converting an inertial force into an electrical signal; a sensor signal processor connected to the sensor element, for outputting an inertial force value; and a power controller for controlling electric power supply to the sensor signal processor, based on the inertial force value. When the inertial force value is maintained for a predetermined time period within a predetermined range in which a reference value is the middle value of the range, the power controller reduces the electric power supply to the sensor signal processor and updates the reference value to the inertial force value obtained after a lapse of the predetermined time period.

17 Claims, 9 Drawing Sheets

(51) Int. Cl.
*G01P 15/08* (2006.01)
*G01P 3/44* (2006.01)
*G01P 15/097* (2006.01)

(56) References Cited

U.S. PATENT DOCUMENTS

| | | |
|---|---|---|
| 2006/0053908 A1 | 3/2006 | Ishigami et al. |
| 2006/0161377 A1* | 7/2006 | Rakkola ............... G01P 13/00 702/141 |
| 2008/0234935 A1* | 9/2008 | Wolf ..................... G01C 21/16 701/472 |
| 2009/0207960 A1 | 8/2009 | Takahashi |
| 2011/0004186 A1 | 1/2011 | Butterfield |
| 2011/0109330 A1 | 5/2011 | Ikuta et al. |
| 2012/0023354 A1* | 1/2012 | Chino .................. G01P 13/00 713/323 |
| 2013/0060515 A1* | 3/2013 | Wei ....................... G01P 15/18 702/141 |

FOREIGN PATENT DOCUMENTS

| | | |
|---|---|---|
| JP | 2002-350139 | 12/2002 |
| JP | 2006-155505 | 6/2006 |
| JP | 2009-040225 | 2/2009 |
| JP | 2009-194741 | 8/2009 |
| JP | 2011-099833 | 5/2011 |
| WO | 2005/019790 | 3/2005 |
| WO | 2011/005634 | 1/2011 |

OTHER PUBLICATIONS

English translation of Chinese Search Report dated May 19, 2016 for the related Chinese Patent Application No. 201380010212.1.

* cited by examiner

PRIOR ART

INERTIAL FORCE SENSOR AND ELECTRONIC DEVICE USING SAME

TECHNICAL FIELD

The present invention relates to an inertial force sensor for use in various electronic devices, e.g. a digital camera, a mobile terminal, and a robot, and to an electronic device including the inertial force sensor.

BACKGROUND ART

Figure 9:
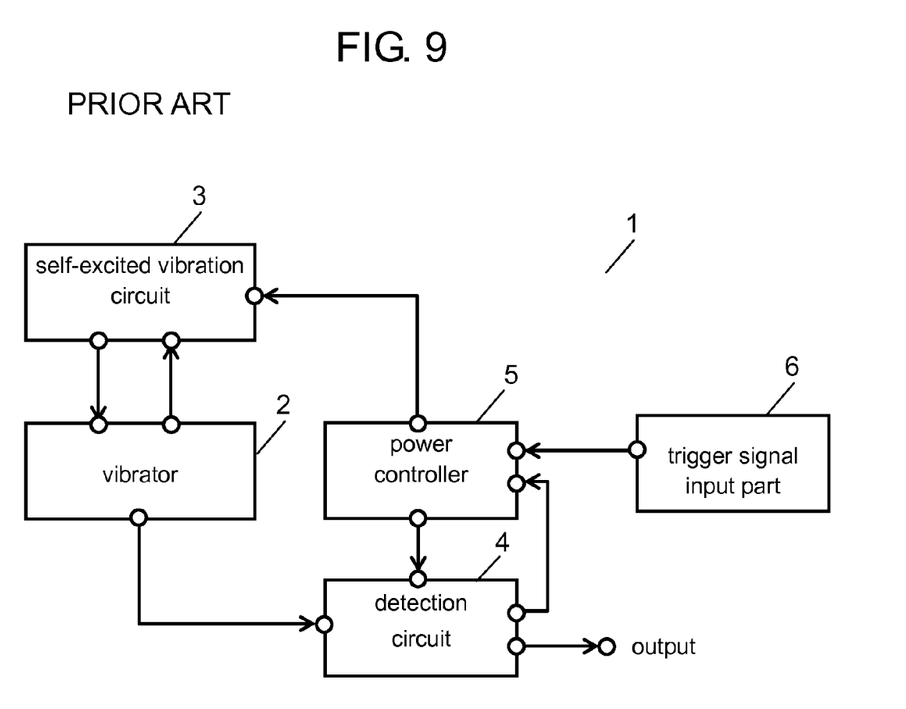
FIG. 9 is a block diagram of a conventional inertial force sensor.

FIG. 9 is a block diagram of a conventional inertial force sensor. Inertial force sensor 1 includes the following elements: vibrator 2; self-exited vibration circuit 3 for driving vibration of vibrator 2; detection circuit 4 connected to vibrator 2, for outputting an inertial force value; power controller 5 for controlling electric power supply to self-exited vibration circuit 3 and detection circuit 4; and trigger signal input part 6 connected to power controller 5.

Power controller 5 reduces the electric power supply to self-exited vibration circuit 3 or detection circuit 4 when detection circuit 4 does not detect the amount of inertia. In response to a trigger input from trigger signal input part 6, power controller 5 restores the reduced electric power supply to self-exited vibration circuit 3 or detection circuit 4 to rated electric power.

For instance, Patent Literature 1 is known as the prior art documents related to the present invention.

CITATION LIST

Patent Literature

PTL1 Japanese Patent Unexamined Publication No. 2002-350139

SUMMARY OF THE INVENTION

An inertial force sensor of the present invention includes the following elements:
- a sensor element for converting an inertial force into an electrical signal;
- a sensor signal processor connected to the sensor element, for outputting an inertial force value; and
- a power controller for controlling electric power supply to the sensor signal processor, based on the inertial force value.

When the inertial force value is maintained for a predetermined time period within a predetermined range in which a reference value is the middle value of the range, the power controller reduces the electric power supply to the sensor signal processor and updates the reference value to the inertial force value obtained after a lapse of the predetermined time period.

DESCRIPTION OF EMBODIMENTS

When vibrator 2 has a large temperature characteristic in conventional inertial force sensor 1, the value of the amount of inertia varies with the temperature change. Thus, even when no inertial force is applied, power controller 5 maintains electric power supply to self-excited vibration circuit 3 and detection circuit 4.

First Exemplary Embodiment

Figure 1:
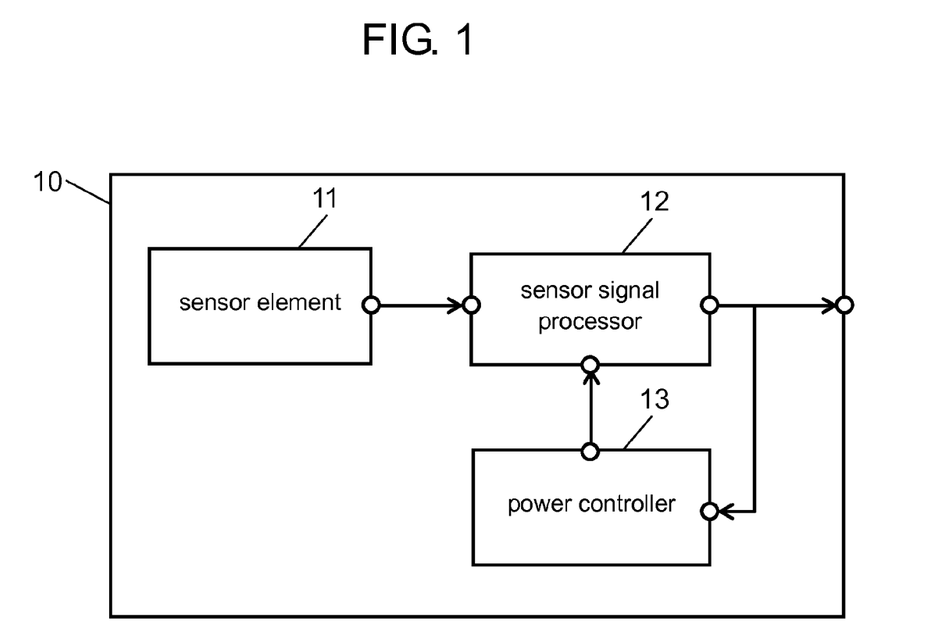
FIG. 1 is a block diagram of an inertial force sensor in accordance with a first exemplary embodiment of the present invention.

FIG. 1 is a block diagram of inertial force sensor 10 in accordance with the first exemplary embodiment of the present invention. Inertial force sensor 10 includes the following elements: sensor element 11 for converting an inertial force into an electrical signal; sensor signal processor 12 connected to sensor element 11, for outputting an inertial force value; and power controller 13 for controlling electric power supply to sensor signal processor 12, based on the inertial force value output from sensor signal processor 12. When the inertial force value is maintained for a predetermined time period within a predetermined range in which a reference value is the middle value of the range, power controller 13 reduces the electric power supply to sensor signal processor 12 and updates the reference value to the inertial force value obtained after a lapse of the predetermined time period. Thus, inertial force sensor 10 can reduce power consumption with a simple configuration and high accuracy.

Hereinafter, a description is provided for a specific configuration example and operation example of inertial force sensor 10, with reference to FIG. 2 through FIG. 4.

Figure 2:
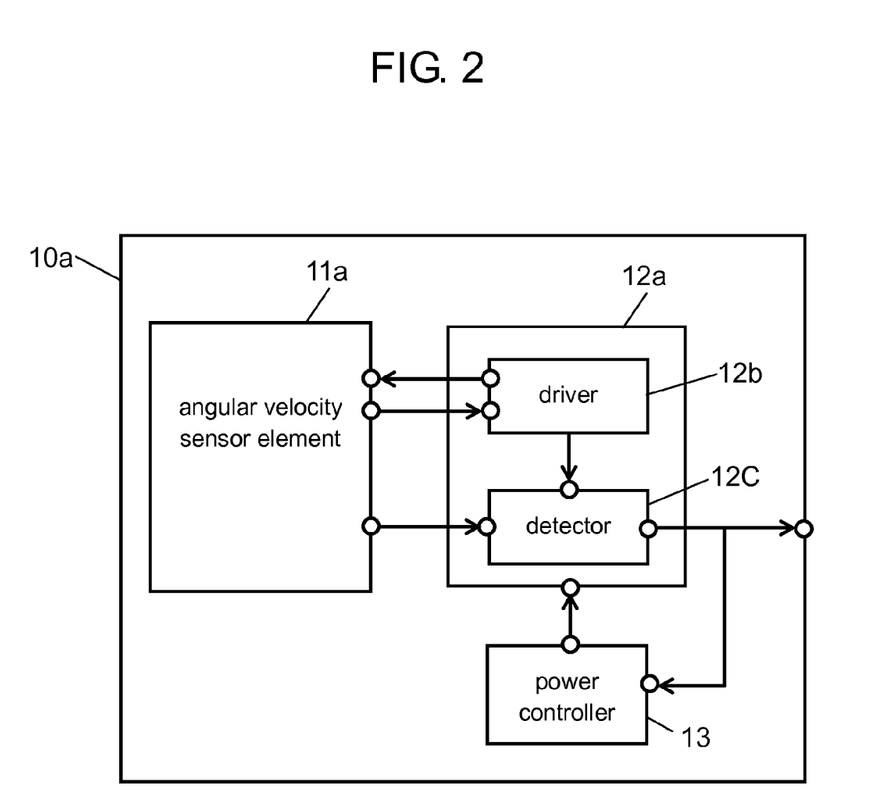
FIG. 2 is a block diagram of an angular velocity sensor in accordance with the first exemplary embodiment.

FIG. 2 is a block diagram of angular velocity sensor 10a as an example of inertial force sensor 10. Angular velocity sensor element 11a corresponds to sensor element 11 of FIG. 1. Angular velocity sensor signal processor 12a corresponds to sensor signal processor 12 of FIG. 1.

Angular velocity sensor element 11a is connected to angular velocity sensor signal processor 12a. Angular velocity sensor signal processor 12a is formed of driver 12b and detector 12c. Driver 12b outputs a drive signal, and thereby drives vibration of angular velocity sensor element 11a. Further, driver 12b receives a monitor signal from angular velocity sensor 11a, and thereby makes feedback control such that driving vibrations of angular velocity sensor element 11a have constant amplitude. Detector 12c detects the detection signal output from angular velocity sensor element 11a, using the monitor signal received from driver 12b, and outputs an angular velocity value obtained by integration using a low-pass filter (not shown).

When the angular velocity value output from detector 12c is maintained for a predetermined time period within a predetermined range in which a reference value is the middle value of the range, power controller 13 reduces the electric power supply to at least one of driver 12b and detector 12c. Preferably, the electric power supply to driver 12b is not reduced, and the electric power supply to detector 12c is reduced. Driver 12b always drives vibration of angular velocity sensor element 11a. This can shorten the start-up time when electric power is restored to the normal power in response to an externally-supplied trigger signal.

Figure 3:
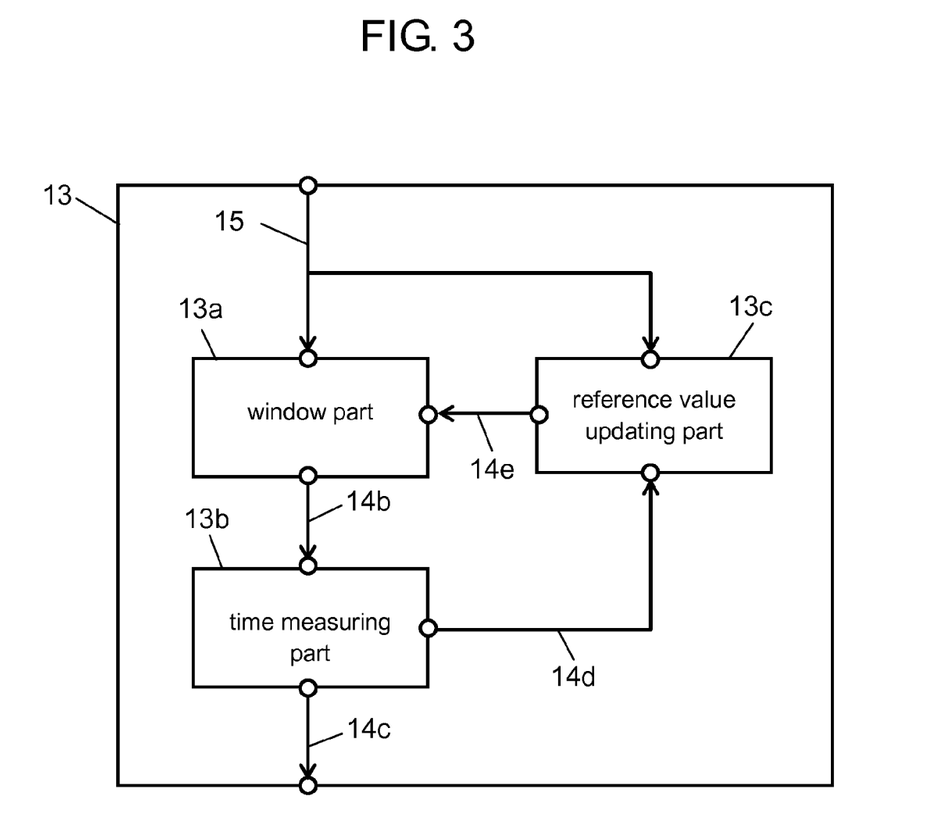
FIG. 3 is a block diagram showing a configuration example of a power controller in accordance with the first exemplary embodiment.

FIG. 3 is a block diagram of power controller 13. Window part 13a receives angular velocity value 15 output from detector 12c. When angular velocity value 15 is within a predetermined range in which a reference value set in window part 13a is the middle value of the range, window part 13a outputs static signal 14b. When static signal 14b is continuously input for a predetermined time period set in time measuring part 13b, the time measuring part outputs electric power supply reducing signal 14c for reducing the electric power supply to sensor signal processor 12, and outputs reference value updating signal 14d. Upon receiving reference value updating signal 14d, reference value updating part 13c outputs angular velocity value 15 as new reference value 14e to window part 13a.

Figure 4:
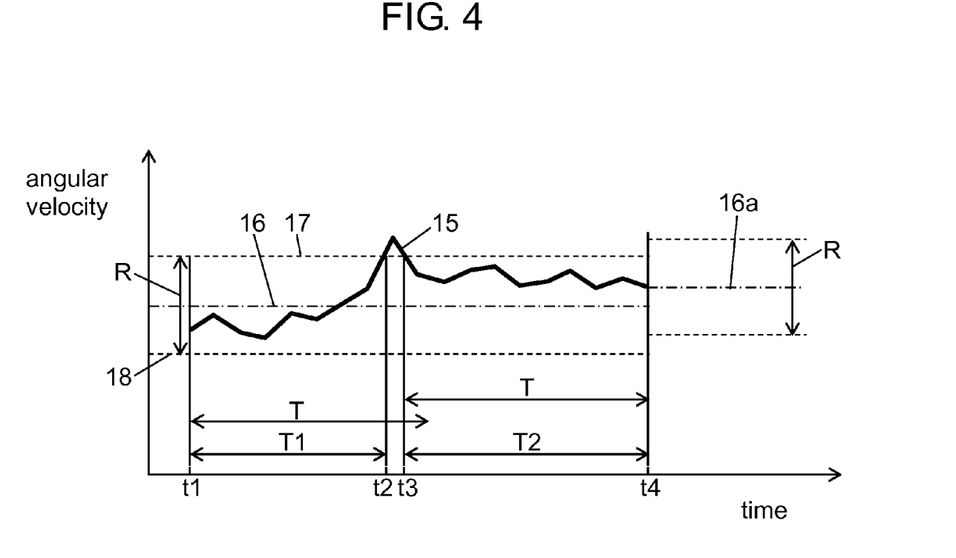
FIG. 4 is a graph showing an example of control of the power controller in accordance with the first exemplary embodiment.

FIG. 4 is a graph showing an example of control of power controller 13. The horizontal axis shows a time; the vertical axis shows an angular velocity. When angular velocity value 15 is within range R in which reference value 16 is the middle value of upper threshold 17 and lower threshold 18, window part 13a (see FIG. 3) outputs static signal 14b (see FIG. 3) to time measuring part 13b (see FIG. 3). With reference to FIG. 4, static signal 14b is output in the time periods from time t1 to time t2, and from time t3 to time t4.

When static signal 14b continues for predetermined time period T, time measuring part 13b outputs electric power supply reducing signal 14c and reference value updating signal 14d. With reference to FIG. 4, static signal 14b is input to time measuring part 13b in the time period from time t1 to time t2. However, time period T1 from time t1 to time t2 is shorter than predetermined time period T, and thus neither electric power supply reducing signal 14c nor reference value updating signal 14d is output. Thereafter, static signal 14b is input again from time t3, and at time t4, time period T2 counted from time t3 becomes equal to predetermined time period T. Thus, electric power supply reducing signal 14c and reference value updating signal 14d are output. As a result, at time t4, the electric power supply to sensor signal processor 12 is reduced and reference value 16 in window part 13 is updated to new reference value 16a, which is an angular velocity value at time t4. That is, reference value 16 is updated to the inertial force value obtained after a lapse of predetermined time period T (new reference value 16a). In this exemplary embodiment, the inertial force value at time t4 after a lapse of predetermined time period T is set to a new reference value. However, the inertial force value exactly at time t4 does not need to be used necessarily. That is, the inertial force values are substantially equivalent before and after the electric power supply to sensor signal processor 12 is reduced, and thus the inertial force value immediately before the lapse of time (in the time period from time t3 to time t4) or immediately after the lapse of time (immediately after time t4) may be used as the new reference value.

In FIG. 4, no angular velocity is applied to angular velocity sensor 10a, but changes in the ambient temperature of angular velocity sensor element 11a gradually increase angular velocity value 15. This makes it highly possible that the angular velocity value output from detector 12c exceeds upper threshold 17. However, in this exemplary embodiment, at time t4, reference value 16 in window part 13 is updated to the angular velocity value at time t4 as new reference value 16a. Thus, after the electric power supply to sensor signal processor 12 is returned to the normal value in response to an externally-supplied trigger signal, window part 13a operates in reference to new reference value 16a. Therefore, even in angular velocity sensor 10a having a large temperature characteristic, low-power-consumption control can be performed with high accuracy.

When angular velocity value 15 exceeds range R in which reference value 16 is the middle value of upper threshold 17 and lower threshold 18 of the range, power controller 13 may lengthen predetermined time period T. For instance, after an angular velocity is applied to an electronic device including angular velocity sensor 10a, this configuration can make the electric power supply to sensor signal processor 12 unlikely to decrease.

Figure 5:
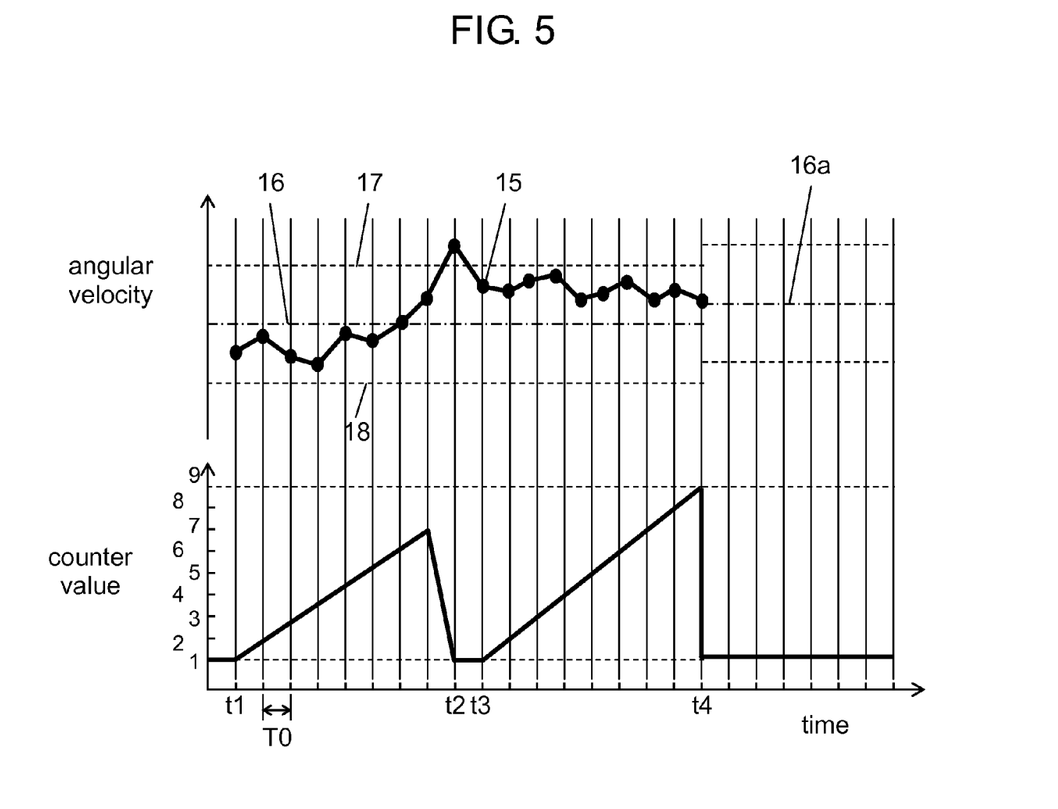
FIG. 5 is a graph showing an example of measuring a predetermined time period using a counter.

FIG. 5 is a graph showing an example of measuring a predetermined time period using a counter in accordance with the first exemplary embodiment of the present invention. Power controller 13 (see FIG. 3) confirms angular velocity value 15 on predetermined cycle T0, and measures predetermined time period T using the product of predetermined cycle T0 and a counter value. Specifically, time measuring part 13b (see FIG. 3) increments the counter value every predetermined cycle T0 while static signal 14b (see FIG. 3) is input. When the counter value exceeds a counter threshold, time measuring part 13b determines that predetermined time period T is reached and outputs electric power supply reducing signal 14c (see FIG. 3) and reference value updating signal 14d (see FIG. 3).

That is, power controller 13 confirms angular velocity value 15 on predetermined cycle T0 and stores the number of predetermined cycles T0. Power controller 13 calculates a time period using the product of predetermined cycle T0 and the number of times, and determines whether the time period is equal to predetermined time period T or not. When the inertial force value is maintained for the predetermined time period within a predetermined range in which the reference value is the middle value of the range, power controller 13 outputs electric power supply reducing signal 14c and reference value updating signal 14d.

In the example of FIG. 5, the counter threshold is 9. The counter value is incremented every predetermined cycle T0. In the period from time t1 to time t2, angular velocity value 15 exceeds upper threshold 17 before the counter threshold reaches 9, and thus the counter value is reset to 0. In the period starting at time t3 and thereafter, the counter value is incremented again. At time t4, the counter threshold reaches 9, and thus time measuring part 13b outputs electric power supply reducing signal 14c and reference value updating signal 14d. Thus, measuring the predetermined time period using a counter allows low-power-consumption control with a simple configuration.

When angular velocity value 15 exceeds range R in which reference value 16 is the middle value of upper threshold 17 and lower threshold 18, power controller 13 may increase the counter threshold. That is, when angular velocity value 15 exceeds a predetermined range in which reference value 16 is the middle value, power controller 13 may increase the number of predetermined cycles T0. For instance, after an electronic device including angular velocity sensor 10a is driven and an angular velocity is applied to the electronic device, this configuration can make the electric power supply to sensor signal processor 12 unlikely to decrease.

When angular velocity value 15 exceeds range R in which reference value 16 is the middle value of upper threshold 17 and lower threshold 18, power controller 13 may extend range R by increasing upper threshold 17 or decreasing lower threshold 18. For instance, after an angular velocity is applied to an electronic device including angular velocity sensor 10a, this configuration can make the electric power supply to sensor signal processor 12 unlikely to decrease.

In the description of this exemplary embodiment, angular velocity sensor 10a is used as a specific example of inertial force sensor 10. The present invention is also applicable to other types of inertial force sensors, such as an acceleration sensor, a pressure sensor, and a geomagnetism sensor.

Second Exemplary Embodiment

Hereinafter, a description is provided for the advantage of the second exemplary embodiment, mainly focusing on the differences from the first exemplary embodiment.

Figure 6:
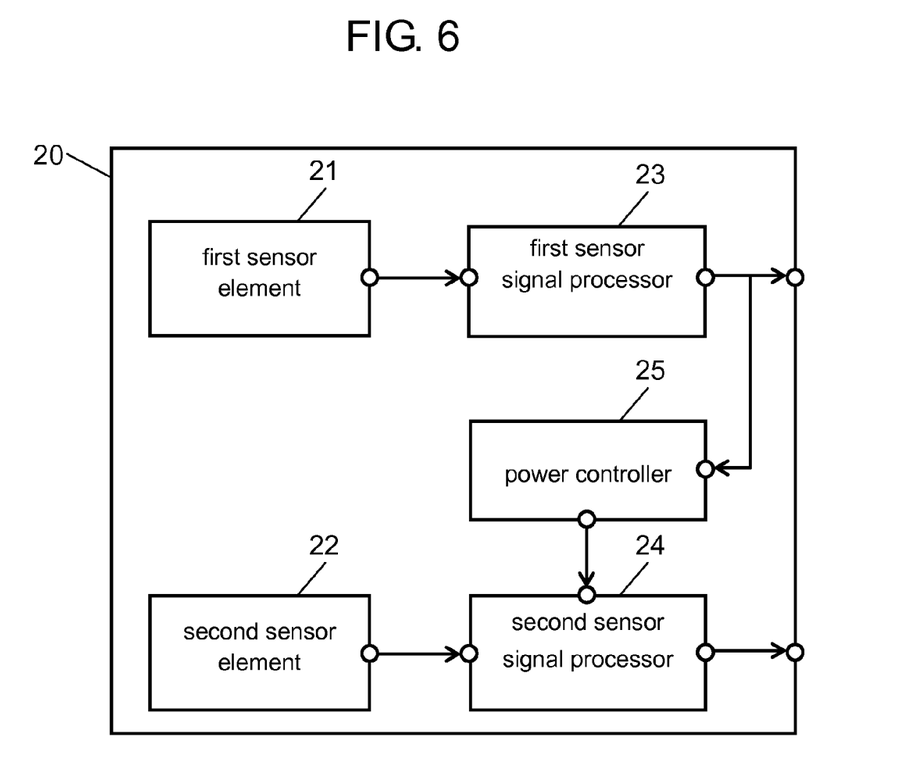
FIG. 6 is a block diagram of an inertial force sensor in accordance with a second exemplary embodiment of the present invention.

FIG. 6 is a block diagram of inertial force sensor 20 in accordance with the second exemplary embodiment of the present invention. Inertial force sensor 20 includes first sensor element 21, second sensor element 22, first sensor signal processor 23, second sensor signal processor 24, and power controller 25. First sensor element 21 converts a first inertial force into an electrical signal. Second sensor element 22 converts a second inertial force, which is different from the first inertial force, into an electrical signal. First sensor signal processor 23 is connected to first sensor element 21 and power controller 25. First sensor signal processor 23 receives an electrical signal from first sensor element 21 and outputs a first inertial force value. Second sensor signal processor 24 is connected to second sensor element 22 and power controller 25. Second sensor signal processor 24 receives an electrical signal from second sensor element 22 and outputs a second inertial force value. Power controller 25 is connected to first sensor signal processor 23 and second sensor signal processor 24. Based on the first inertial force value, power controller 25 controls the electric power supply to second sensor signal processor 24. When the first inertial force value is maintained for a predetermined time period within a predetermined range in which a reference value is the middle value of the range, power controller 25 reduces the electric power supply to second sensor signal processor 24 and updates the reference value to the first inertial force value.

This configuration allows low-power-consumption control of second sensor signal processor 24 to be performed based on the first inertial force value with high accuracy. Preferably, in two sensor signal processors, one having lower power consumption is set to first sensor signal processor 23. With this configuration, the power consumption of second sensor signal processor 24, which is higher than that of the first sensor signal processor, can be reduced, using the first inertial force detectable with lower power consumption.

Figure 7:
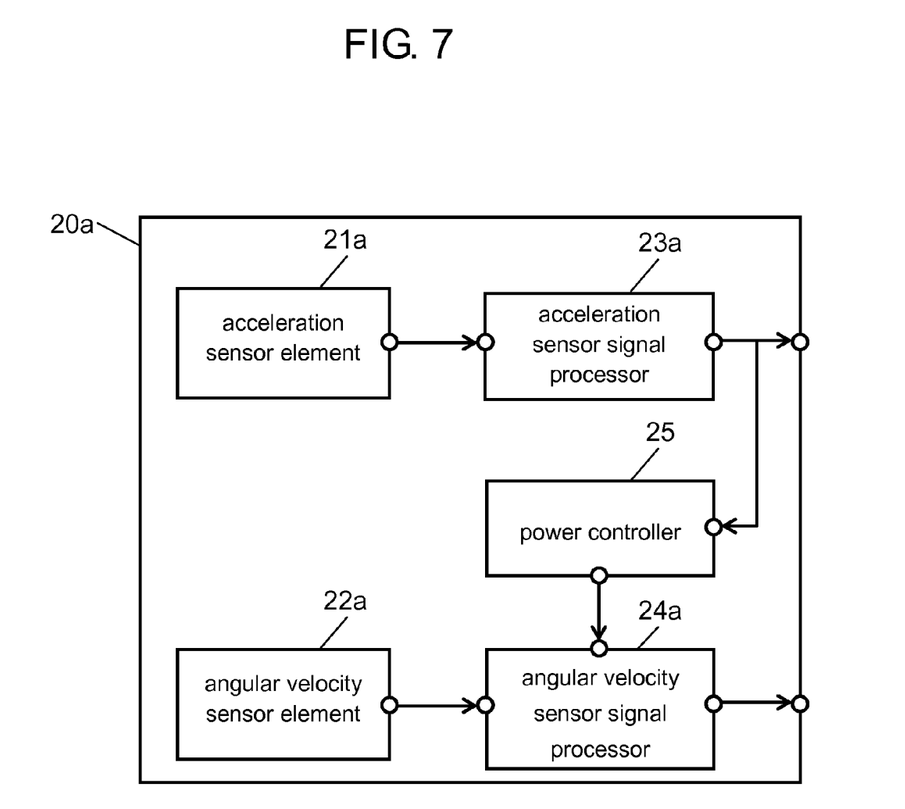
FIG. 7 is a block diagram of an inertial force sensor that includes an acceleration sensor element and an angular velocity sensor element in accordance with the second exemplary embodiment.

FIG. 7 is a block diagram of inertial force sensor 20a, as an example of inertial force sensor 20, that includes acceleration sensor element 21a and angular velocity sensor element 22a. Acceleration sensor element 21a is used as first sensor element 21, and angular velocity sensor element 22a is used as second sensor element 22.

Acceleration sensor element 21a has a flexible portion (not shown), and the displacement of the flexible portion caused by acceleration is converted into an electrical signal. Acceleration sensor signal processor 23a detects the electrical signal.

Angular velocity sensor element 22a has a flexible portion (not shown). A driving vibration is applied to the flexible portion, and the displacement of the flexible portion caused by Coriolis force is converted into an electrical signal. Here, the Coriolis force occurs in the axial direction orthogonal to both of the vibration drive shaft and the shaft to which an angular velocity is applied. Angular velocity sensor signal processor 24a outputs the electrical signal.

As shown in FIG. 2, angular velocity sensor signal processor 24a includes a driver and a detector. The driver drives vibration of angular velocity sensor element 22a. Thus, the power consumption of angular velocity sensor signal processor 24a is higher than that of acceleration sensor signal processor 23a.

When the acceleration value output from acceleration sensor signal processor 23a is maintained for a predetermined time period within a predetermined range in which a reference value is the middle value of the range, power controller 25 reduces the electric power supply to angular velocity sensor signal processor 24a. Thus, in the inertial force sensors for detecting two different types of inertial forces, the power consumption in the signal processor having higher power consumption can be reduced.

Further, the operation of restoring angular velocity sensor signal processor 24a can be performed using acceleration sensor signal processor 23a. For instance, when the acceleration value output from acceleration sensor signal processor 23a exceeds a predetermined threshold, power controller 25 restores the electric power supply to angular velocity sensor signal processor 24a to the normal value. With this configuration, low-power-consumption control and restore control can be performed only in inertial force sensor 20a without any externally-supplied trigger signal.

In this exemplary embodiment, acceleration sensor element 21a is used as first sensor element 21, and a geomagnetism sensor element or an atmospheric pressure sensor element may be used. Angular velocity sensor element 22a is used as second sensor element 22, and a vibrating type acceleration sensor element and a vibrating type distortion sensor element may be used.

Figure 8:
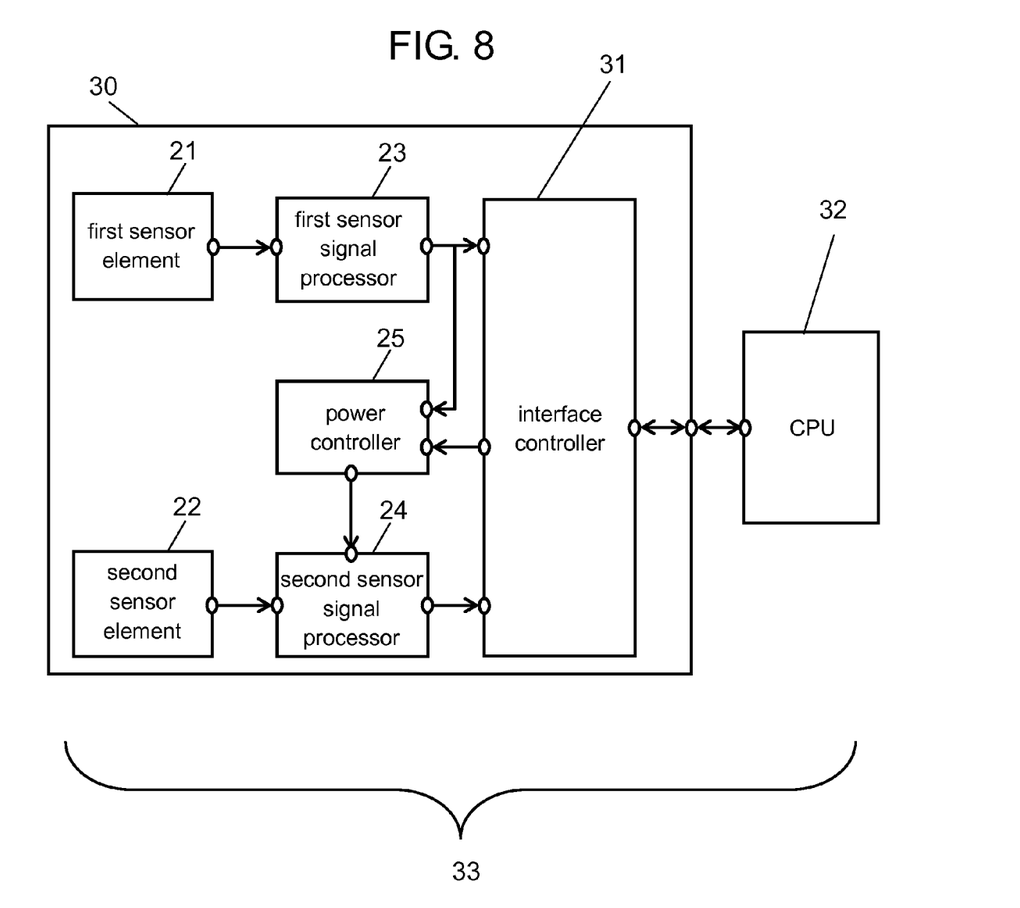
FIG. 8 is a block diagram of an electronic device including the inertial force sensor in accordance with the second exemplary embodiment.

FIG. 8 is a block diagram of electronic device 33 including inertial force sensor 30 in accordance with the second exemplary embodiment of the present invention.

Inertial force sensor 30 is different from inertial force sensor 20 of FIG. 6 in that inertial force sensor 30 has interface controller 31. Interface controller 31 is connected to first sensor signal processor 23, second sensor signal processor 24, and power controller 25.

A first inertial force value output from first sensor signal processor 23 is input to interface controller 31 and power controller 25. A second inertial force value output from second sensor signal processor 24 is input to interface controller 31.

Interface controller 31 is connected to CPU 32 provided outside inertial force sensor 30 and can transmit signals to the CPU and receive signals from the CPU. Interface controller 31 can also transmit signals to power controller 25. The other operations are the same as those in inertial force sensor 20, and the description thereof is omitted.

CPU 32 changes the polling period in which signals are transmitted to and received from interface controller 31 in response to the normal state (operating state) or the sleep state (non-operating state). Specifically, CPU 32 makes the polling period in the sleep state (non-operating state) longer than the polling period in the normal state (operating state). That is, CPU 32 lengthens the signal transmission and reception period while the electric power supply to second sensor signal processor 24 is reduced. CPU 32 for controlling electronic device 33 has a large circuit scale, which increases the power consumption. Lengthening the polling period in the sleep state (non-operating state) can reduce the processing load of CPU 32, thus reducing the power consumption of electronic device 30. Here, the normal state means the state where inertial sensor 30 is in operation, and the sleep state means the state where inertial sensor 30 is not in operation.

In this exemplary embodiment, a description is provided for a configuration where interface controller 31 is added to inertial force sensor 20. Interface controller 31 may be added to inertial force sensor 10 of FIG. 1 and connected to CPU 32. In this case, CPU 32 lengthens the signal transmission and reception period while the electric power supply to sensor signal processor 12 is reduced.

Also in this exemplary embodiment, examples of first sensor element 21 include an acceleration sensor element, a geomagnetism sensor element, and an atmospheric pressure sensor element. Examples of second sensor element 22 include an acceleration sensor element, a vibration type acceleration sensor element, and a vibration type distortion sensor element.

INDUSTRIAL APPLICABILITY

The inertial force sensor of the present invention can reduce power consumption with a simple configuration and high accuracy, and thus is useful as an inertial force sensor for use in various electronic devices, such as a digital camera, a mobile terminal, and a robot.

REFERENCE MARKS IN THE DRAWINGS

1, 10, 20, 20*a*, 30 Inertial force sensor
10*a* Angular velocity sensor
11 Sensor element
11*a* Angular velocity sensor element
12 Sensor signal processor
12*a* Angular velocity sensor signal processor
13 Power controller
13*a* Window part
13*b* Time measuring part
13*c* Reference value updating part
14*b* Static signal
14*c* Electric power supply reducing signal
14*d* Reference value updating signal
14*e*, 16*a* New reference value
15 Angular velocity value
16 Reference value
17 Upper threshold
18 Lower threshold
21 First sensor element
21*a* Acceleration sensor element
22 Second sensor element
22*a* Angular velocity sensor element
23 First sensor signal processor
23*a* Acceleration sensor signal processor
24 Second sensor signal processor
24*a* Angular velocity sensor signal processor
25 Power controller
31 Interface controller
32 CPU
33 Electronic device

The invention claimed is:

1. An inertial force sensor comprising:
   a sensor element configured to convert an inertial force into an electrical signal;
   a sensor signal processor connected to the sensor element and configured to receive the electrical signal and output an inertial force value; and
   a power controller configured to
   reduce an electric power supply to the sensor signal processor when the inertial force value is maintained for a predetermined range, and configured to update a middle value of the predetermined range when the inertial force value is maintained for a predetermined time period.

2. The inertial force sensor of claim 1, wherein when the inertial force value exceeds the predetermined range, the power controller is configured to lengthen the predetermined time period.

3. The inertial force sensor of claim 1, wherein when the inertial force value exceeds the predetermined range, the power controller is configured to extend the predetermined range.

4. The inertial force sensor of claim 1, wherein the power controller is configured to confirm the inertial force value on a predetermined cycle, and determine the predetermined time period, using a product of the predetermined cycle and a predetermined number of times.

5. The inertial force sensor of claim 4, wherein when the inertial force value exceeds the predetermined range, the power controller is configured to increase the predetermined number of times.

6. An inertial force sensor comprising:
   a first sensor element configured to convert a first inertial force into an electrical signal;
   a second sensor element configured to convert a second inertial force, which is different from the first inertial force, into an electrical signal;
   a first sensor signal processor connected to the first sensor element and configured to output a first inertial force value;
   a second sensor signal processor connected to the second sensor element and configured to output a second inertial force value; and
   a power controller configured to reduce an electric power supply to the second sensor signal processor based on the first inertial force value
   when the inertial force value is maintained for a predetermined range, and configured to update a middle value of the predetermined range when the inertial force value is maintained for a predetermined time period.

7. The inertial force sensor of claim 6, wherein when the first inertial force value exceeds the predetermined range, the power controller is configured to lengthen the predetermined time period.

8. The inertial force sensor of claim 6, wherein when the first inertial force value exceeds the predetermined range, the power controller is configured to extend the predetermined range.

9. The inertial force sensor of claim 6, wherein the power controller is configured to confirm the first inertial force value on a predetermined cycle, and determine the predetermined time period, using a product of the predetermined cycle and a predetermined number of times.

10. The inertial force sensor of claim 9, wherein when the first inertial force value exceeds the predetermined range, the power controller is configured to increase the predetermined number of times.

11. An electronic device comprising:
the inertial force sensor of claim 1; and
a CPU configured to periodically transmit signals to and receive signals from the inertial force sensor,
wherein the CPU is configured to lengthen a cycle of transmission and reception of the signals while the electric power supply to the sensor signal processor is reduced.

12. An electronic device comprising:
the inertial force sensor of claim 6; and
a CPU configured to periodically transmit signals to and receive signals from the inertial force sensor,
wherein the CPU is configured to lengthen a cycle of transmission and reception of the signals while the electric power supply to the second sensor signal processor is reduced.

13. An inertial force sensor comprising:
a sensor element configured to convert an inertial force into an electrical signal;
a sensor signal processor connected to the sensor element and configured to receive the electrical signal and output an inertial force value; and
a power controller configured to control electric power supply to the sensor signal processor, based on the inertial force value, wherein the power controller includes:
a window part configured to output static signal when the inertial force value is maintained within a predetermined range;
a time measuring part configured to receive the static signal and output an electric power supply reducing signal and a reference value updating signal when the static signal continues for a predetermined time period, the electric power supply reducing signal is configured to reduce the electric power supply to the sensor signal and the reference value updating signal is configured to update a middle value of the predetermined range.

14. The inertial force sensor of claim 13, wherein when the inertial force value exceeds the predetermined range, the power controller is configured to lengthen the predetermined time period.

15. The inertial force sensor of claim 13, wherein when the inertial force value exceeds the predetermined range, the power controller is configured to extend the predetermined range.

16. The inertial force sensor of claim 13, wherein the power controller is configured to confirm the inertial force value on a predetermined cycle, and determine the predetermined time period, using a product of the predetermined cycle and a predetermined number of times.

17. The inertial force sensor of claim 16, wherein when the inertial force value exceeds the predetermined range, the power controller is configured to increase the predetermined number of times.

* * * * *